Feb. 6, 1962 R. W. RUPPERT 3,019,648
DIFFERENTIAL PRESSURE GAUGE
Filed Oct. 29, 1958 2 Sheets-Sheet 1
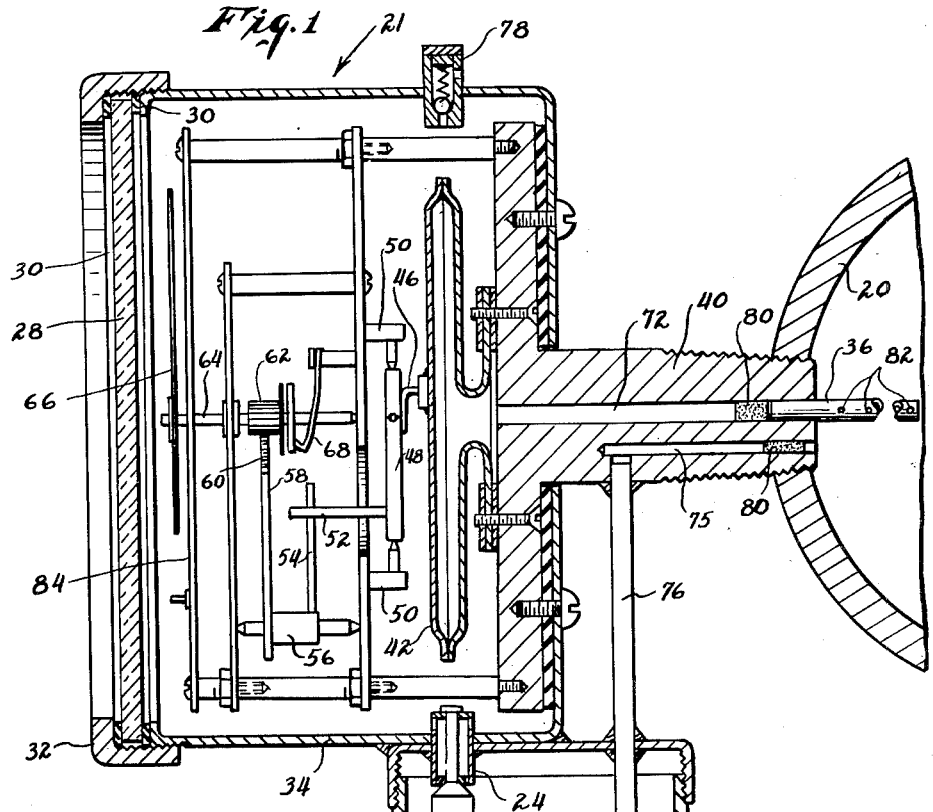
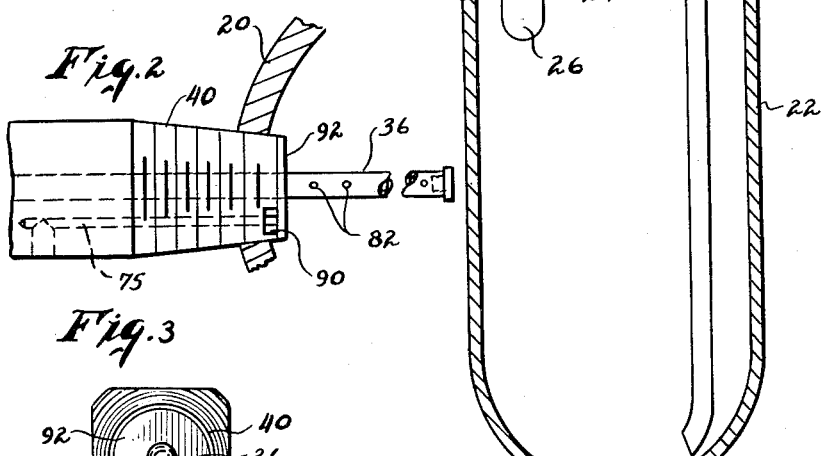
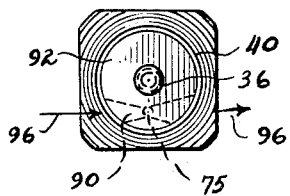
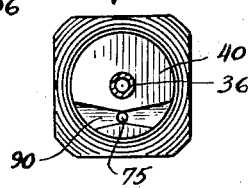
INVENTOR.
Robert W. Ruppert
BY Emery, Whittemore,
Sandoe & Dix.
ATTORNEYS Feb. 6, 1962 R. W. RUPPERT 3,019,648
DIFFERENTIAL PRESSURE GAUGE
Filed Oct. 29, 1958 2 Sheets-Sheet 2
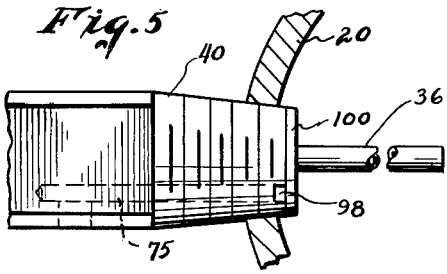
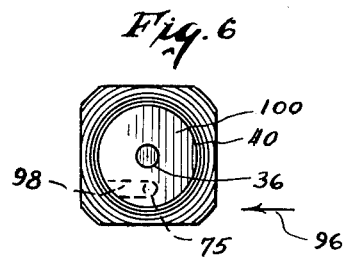
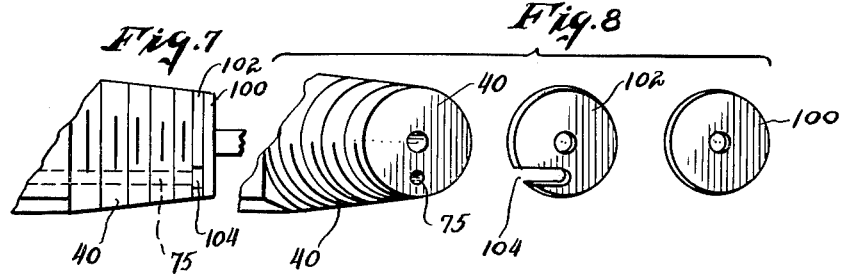
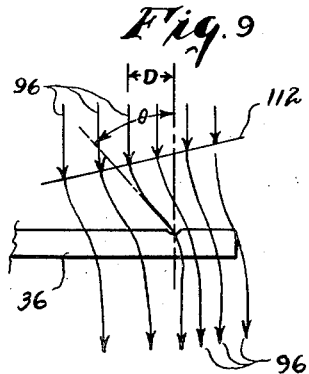
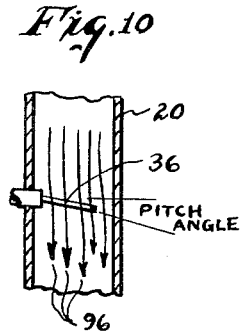
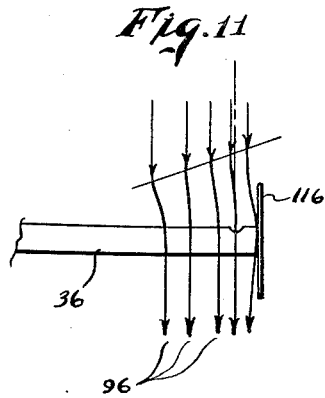
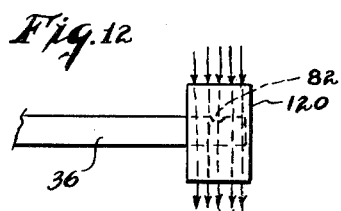
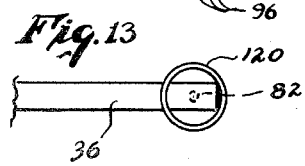
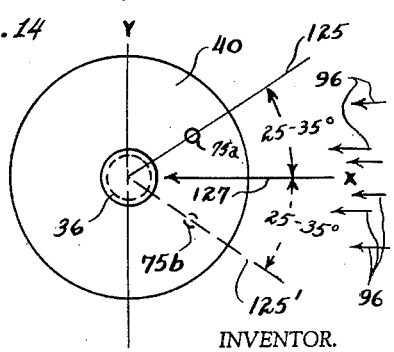
INVENTOR.
Robert W. Ruppert
BY Emery, Whittemore,
Sandoe & Dix
ATTORNEYS United States Patent Office 3,019,648
Patented Feb. 6, 1962

3,019,648
DIFFERENTIAL PRESSURE GAUGE
Robert W. Ruppert, 242 Globe Ave., Union, N.J.
Filed Oct. 29, 1958, Ser. No. 770,398
6 Claims. (Cl. 73—212)

My invention relates to the measurement of the rate of flow of fluids through pipe lines, etc. Knowledge of flow rate is a mandatory function in many industries and is found in nearly every area where some degree of process control is required. Although many methods exist for the measurement of fluid flow rate, most are complex and expensive.

There is definite need for a simple, accurate, and inexpensive device to measure and directly indicate fluid flow rate, combined also with simplified installation in the pipe line. My invention has for its basic purpose the fulfillment of this need by the use of well-known apparatus of a standard nature and designed for other uses, but which, with certain novel modifications and changes as later described, can be readily employed for the new and useful purpose of measuring and directly indicating fluid flow rates.

Of the several techniques used for determining fluid flow rate, one of the most accurate depends on detecting the mean velocity pressure of the flowing stream. This entails measuring a differential pressure, namely the difference between stream total pressure and stream static pressure at a location of known cross-sectional area. Knowing the density of the fluid then enables the mean velocity and flow rate of the stream to be inferred by means of well known equations of fluid dynamics.

One object of my invention is to provide a simple yet reliable device to indicate differential pressures and in particular the difference between total pressure and static pressure of a flowing fluid or related quantities, which value can be directly indicated on a scale calibrated in either units of pressure, velocity or of flow rate.

A further object of my invention is to provide an inexpensive flow rate meter for simplified insertion into a conduit in which fluid is flowing and the flow rate of which is to be determined.

Still another object of my invention is to produce a flow meter which can be made sensitive to very low flow rates by introducing novel means to amplify or increase the measured velocity head over the true velocity head.

Another object of my invention is to provide means, when measuring liquid flow rates, for preventing the entrance of liquid into the meter housing.

Yet another object of my invention is to provide novel means for rendering the total pressure-sensing probe less subject to errors caused by pitch and yaw angles and by total pressure gradients within the fluid stream.

A further object is to provide means of measuring a true static pressure in the vicinity of a probe or similar obstruction with little or no interference therefrom.

Other objects, features and advantages of the invention will appear or be pointed out as the description proceeds.

In the drawing, forming a part hereof, in which like reference characters indicate corresponding parts in all the views;

FIGURE 1 is a vertical sectional view showing a meter and a differential pressure indicator made in accordance with this invention;

FIGURE 2 is a fragmentary, detail view showing a modified construction for the static pressure measurement portion of the invention;

FIGURE 3 is an end view of the construction shown in FIGURE 2;

FIGURE 4 is a view similar to FIGURE 3, but with the outer cover washer removed;

FIGURE 5 is a fragmentary, detail view showing a second modification of the static pressure measuring structure of the invention;

FIGURE 6 is an end view of the modified construction shown in FIGURE 5;

FIGURE 7 is a detailed view showing a third modification of static measuring structure of the invention;

FIGURE 8 is an exploded view of the structure shown in FIGURE 7;

FIGURE 9 is a diagram showing the way the fluid flow may be deflected to produce inaccurate readings around a conventional probe;

FIGURE 10 is a diagram showing another way in which the pressure measurements are affected within a tube;

FIGURE 11 is a detail view showing a modified construction of the invention for correcting the error illustrated in FIGURE 9;

FIGURES 12 and 13 are top plan and front views, respectively, of a second modified construction for correcting the errors illustrated in FIGURE 9; and FIGURE 14 is a diagrammatic view showing advantageous locations for the passage for determining static pressure of the fluid.

FIGURE 1 shows an embodiment of the invention connected with a conduit 20 for measuring the fluid flow in the conduit. This embodiment of the invention utilizes a standard, pressure gauge 21 of proper capacity and which has been modified in various ways. One modification is the provision of a compression chamber 22 at the lower part of the gauge housing, the chamber communicating with the interior of the gauge housing through a pipe 24 having a float check valve 26 which closes the entrance to the pipe 24 in the event that the compression chamber 22 becomes filled with liquid beyond the level of said float check valve. The pressure gauge 21 is also modified by sealing the glass window 28 of the gauge with gaskets 30 clamped against both sides of the glass 28 by a bezel ring 32 that threads over a front portion of a housing 34 of the gauge. The housing 34 is sealed wherever else it may be necessary in order to make the interior of the housing pressure tight.

A probe 36 for measuring the stream total pressure within the conduit, that is, both the static and dynamic pressure of the flowing fluid, is fixed into the stem 40 of the pressure gauge and the interior of the probe 36 communicates with a bellows 42 within the gauge housing 34.

Variation in the pressure within the bellows 42 moves an arm 46 to rock a shaft 48 supported by pivots at both ends in bearing elements 50. An arm 52 extends from the shaft 48 into the path of a crank 54 extending upwardly from another shaft 56; and this shaft 56 has pivot bearings at its opposite ends which are supported by portions of the frame of the gauge. An arm 58 extends upwardly from the shaft 56 and carries a gear quadrant 60 at its upper end. This gear quadrant 60 meshes with a pinion gear 62 on a spindle 64 to which an indicator hand 66 is secured. The spindle 64 rotates in bearings in the frame of the gauge and there is a torsion spring 68 for returning the spindle 64 and hand 66 to a zero position when there is no pressure displacing the front wall of the bellows 42. This gauge mechanism from the bellows 42 to the indicator hand 66 is conventional.

The gauge stem 40, in addition to the usual passage 72 leading to the interior of the bellows 42, has another passage 75 opening through its end face and communicating with a tube 76 which leads to the compression chamber 22. There is a spring-loaded ball pressure relief valve 78 located at the top of the gauge housing 34 for relieving any excessive pressure to which the interior of the gauge may be subjected. In order to damp out pressure pulsations in the gauge, there are porous filter elements 80 located in the passage 72 and in the other passage 75. For purposes of the operation of the apparatus, the passage 75, tube 76, compression chamber 22 and pipe 24 are all part of a passage through which pressure in the conduit is transmitted to the interior of the gauge and to the outside of the bellows 42.

In the operation of the apparatus shown in FIGURE 1, fluid flowing in the conduit 20 toward the probe 36 exerts a dynamic pressure against the fluid within the probe 36 through openings 82 which face the direction of the oncoming fluid flow. A single pressure opening 82 would suffice, however, a plurality of holes may be so positioned to give an average value of total pressure along the length of the probe. This pressure, created by the moving fluid being brought to rest, is exerted through the openings 82 against the fluid within the probe 36 and is transmitted to the interior of the bellows 42. The pressure is a total pressure; that is, a combination of the static and dynamic pressure existing in the flowing fluid within the conduit 20.

The passage 75 opens into the conduit 20 in a direction at right angles to the direction of the flow of fluid, and thus the pressure of the flowing fluid column against the fluid in the passage 75 is the static pressure of the fluid in the conduit 20. This static pressure, as previously explained, is transmitted to the interior of the gauge housing 34 and exerts itself against the outside of the bellows 42.

Thus the movement of the bellows 42, and the resulting movement of the indicator hand 66 as transmitted through the motion-transmitting connections, is responsive to the difference in the pressures in the passages 72 and 75. This difference between static and total pressures is known as velocity pressure and is directly proportional to the second power of the velocity of the fluid flowing in the conduit 20. It is given by the equation $$h = \frac{V^2}{2g}$$

where $h$=velocity head in feet of the fluid flowing; $V$=fluid velocity, feet per second; $g$=acceleration of gravity=32.2 feet per second$^2$ (constant for a given location).

By detecting $h$, or velocity pressure, we may then determine $V$, the fluid velocity. Knowing $V$, and the cross sectional area of the conduit the flow rate is given by the equation of continuity $Q=VA$, where $Q$=flow, $V$=velocity, and $A$=conduit cross sectional area. Since the cross section of conduit 20 is known, the face 84 of the gauge can be calibrated by mathematical inference to read in terms of flow rate, mean stream velocity or simply differential pressure, as desired.

In cases where the fluid flowing in the conduit 20 is a liquid, and where positive static pressures are encountered, liquid will enter the static pressure passage 75 and flow into the compression chamber 22 until the air or gas in the chamber and in the gauge housing 34 have been compressed and exert a pressure equal and opposite to the pressure in the conduit 20. The compression chamber 22 is made large enough so that with the maximum pressure anticipated, the liquid will rise no higher than the pipe 24 communicating with the interior of the gauge housing 34. As a precaution against accidental overpressure, and a liquid level which would rise into the interior of the gauge housing, the float check valve 26 is provided for closing the passage into the gauge housing 34 before any liquid can enter the pipe 24.

As a precaution against pressure surges which might damage the gauge, when working with gas pressure in the conduit 20, the relief valve 78 is provided on the gauge housing to relieve gas pressure from the housing before the pressure reaches a dangerous magnitude.

When the flow rate is low in the conduit 20, the difference between static and total pressure may be quite small and difficult to measure. In order to amplify the difference in pressure in the passages 72 and 75 to give more accurate readings of velocity or total flow, my invention includes a number of expedients for reducing the pressure exerted in the passage 75. One way in which this is accomplished is illustrated in the FIGURES 2–4. In this modified construction the end face of the gauge stem 40 has a channel 90 cut in its face, and the passage 75 opens into this channel 90 at a region intermediate the ends of the channel. The side walls of the channel 90 are made so that they converge toward the passage 75 from either end of the channel.

A washer 92 is attached to the end face of the gauge stem 40 and this washer covers the open side of the channel 90 and makes the channel 90 a passage through which part of the fluid in the conduit 20 flows in the direction indicated by the arrows 96 in FIGURE 3. By virtue of the converging and then diverging side walls of the passage 90, and the location of the end of the passage 75 at the narrowest cross section of the passage 90, this passage 90 acts as a venturi and causes a much reduced static pressure at the end of the passage 75. While this reduced pressure is not the true stream static pressure in the conduit 20, it is related to the static pressure and the flow-rate or velocity of flow, and by simple computations the gauge can be calibrated to read directly in terms of flow. Because of the greater difference in pressure in the passages 72 and 75, a larger movement of the gauge indicator is obtained for a given flow and flow through the conduit can be measured with greater accuracy and sensitivity. The measured total pressure is unchanged. I have found through calibration that the gain in indicated velocity pressure is more constant with liquids than gases over a wide range of flow rates. Compressibility causes a variable gain with gases. The gain first increases with flow and then decreases where compressibility effects become dominant. However, this variation can be incorporated into the calibration of the meter.

FIGURES 5 and 6 show another modified construction for obtaining a lower pressure in the passage 75. In the construction shown in FIGURES 5 and 6, the end face of the gauge stem 40 is formed with a channel 98 having parallel side walls and leading from the end of the passage 75 to the side of the gauge stem 40 in the direction of the fluid flow in the conduit, as indicated by the arrows 96. A washer 100 is attached to the end face of the stem 40 and covers the open side of the channel 98.

With this construction shown in FIGURES 5 and 6, the flow of fluid around the stem 40 and past the end face of the washer 100 causes an aspirator action which tends to suck fluid from the channel 98 and from the passage 75 with a resulting reduction in pressure in the passage 75. As in the case of the venturi passage of FIGURES 2–4, the gauge can be calibrated to read accurately with allowances for the reduced pressure caused by the aspirator action and the rate of flow can be measured more accurately than with the construction shown in FIGURES 1 and 2 because of the greater displacement of the diaphragm in the pressure gauge and the resulting increased movement of the indicator hand. Both constructions eliminate probe interference effects on measured static pressure.

FIGURES 7 and 8 show another modification construction in which the same result can be obtained as in FIGURES 5 and 6, but in a simpler way. Instead of cutting a channel in the stem 40 of the gauge, a washer 102 is provided with a slot 104 extending part way across the washer and in position to register with the end of the passage 75 where it opens through an end face of the stem 40. An outer washer 100 is placed over the washer 102 and the slot 104 then becomes a passage similar to the passage 98 but more economical to construct.

The venturi passage shown in FIGURES 2–4 increases the pressure deferential or apparent velocity pressure by as much as 100 to 900%. A reduced pressure provided by channel 98 and the slot 104, shown in FIGURES 5–8, produces an increase in the apparent velocity pressure by approximately to 60 to 78%. If a very large increase is not necessary, the modifications of FIGURES 5–8 are sufficient; but if a very large amplification is required because of an extremely low flow-rate, then the more elaborate expedient shown in FIGURES 2–4 should be used.

FIGURE 9 is a diagrammatic view in which the arrows 96 represent the direction of fluid flow past the probe 36. There is a tendency for the flow to be drawn toward the end of the probe 36 since the flow is unrestricted beyond the probe. This change in the actual flow direction at the location of the openings into the probe 36 causes an erroneous pressure change in the probe, the change being somewhat less than it should be because of the angle of the flow indicated by $\theta$, an induced pitch angle. The pressure gradient is indicated by the line 112 and it will be apparent that the pressure actually encountered at a particular location along the length of the probe 36 is not the pressure which should be encountered at that location across the stream because of the deflection in the flow pattern. The error in location is indicated by the distance D.

FIGURE 10 shows another cause of inaccurate indications when using a probe in a conduit having fluid flow. The flow in the conduit 20 is again indicated by the arrows 96 and in the situation illustrated, the probe 36 is moved into an angular position by the drag forces of the fluid on the probe. In the diagram, the probe has been deflected through the angle indicated as the "pitch angle" and it will be evident that this causes the fluid stream to strike against the probe in a direction which is not at right angles and with resulting inaccuracy in the readings as computed for flow against a right angle probe. This pitch angle may also be caused by improper installation of the probe in the conduit.

FIGURE 11 shows a construction which eliminates or corrects errors due to total pressure gradients as indicated in FIGURE 9. In the construction shown in FIGURE 11 there is a disc forming a flange 116 attached to the outer end of the probe 36. This flange has a diameter at least approximately three and one half times as large as the diameter of the probe 36. The direction of fluid flow, as indicated by the arrows 96, is substantially unaffected by any probewise flow at the region of the openings through which the fluid exerts a dynamic pressure against the fluid within the interior of the probe 36. The disc should be placed from 1 to 4 probe diameters away from the opening 82. A disc on either side of opening 82 is beneficial where the total pressure gradient direction is unknown.

FIGURES 12 and 13 show another expedient for correcting distortion of the fluid flow in a direction axially along the probe 36. In this construction a cylindrical shell 120 is placed on the probe 36, with the opening 82 in the probe located substantially along the longitudinal axis of the cylindrical shell 120. The length of the shell 120 is several times that of the probe diameter and the flow of fluid through the shell, indicated by the arrows 96, cannot be deflected by the probe 36 because of the confinement of the flow within the shell 120 and the fact that there is no probe ending within the shell, presenting an unobstructed path for the fluid flow. The cylindrical shell 120 may be desirably made "barrel shaped" with an increased diameter at the section containing the probe so as to keep a constant cross sectional area for flow through the shell. This will maintain equal velocities within and along the length of the shell 120.

FIGURE 14 shows the ideal locations for a static pressure passage which opens through an end face of a gauge stem. The stem is indicated by the reference character 40 as in the other views, and two static pressure passages 75$^a$ and 75$^b$ are shown opening through the end face of the stem 40. These openings correspond, except as to location, to the passage 75 shown in many of the other figures of the drawing. If desired, only one of the openings 75$^a$ or 75$^b$ can be employed.

When the end of the passages 75$^a$ and 75$^b$ are near the probe, the static pressure transmitted to the fluid column in these passages is affected by changes in the direction and velocity of the flow around the probe. If the end of the passages 75$^a$ and 75$^b$ are upstream from the probe, the pressure is increased by the impingement of fluid on the probe and if the static pressure is measured from a location immediately over or under the probe, the pressure indicated is less than the true static pressure because of distortion by velocity.

I have found that the most advantageous locations for a static pressure passage when it opens through the end face of the gauge stem, is along a line 125 or 125′ extending from the longitudinal axis of the probe 36 and lying at about 25 to 35 degrees to a plane 127 which passes through the longitudinal axis of the probe and which extends from the probe in a direction opposite to the direction of the fluid flow through the conduit and parallel thereto.

The preferred construction and a number of modifications of the invention have been illustrated and described, but other changes and modifications can be made and some features can be used in different combinations without departing from the invention as defined in the claims.

What is claimed is:

1. An indicator for operation by the difference between the pressures at two different locations in a conduit through which a fluid is flowing, said indicator including a probe extending into the flow stream in the conduit and having an opening facing the oncoming fluid flow for obtaining a combined dynamic and static pressure head within the probe, a first passage communicating with the conduit at another location and opening into the conduit in a direction free of components facing the oncoming fluid for measuring a lower pressure of the fluid, an aneroid pressure gauge including a diaphragm chamber having a diaphragm forming one wall thereof, and a second chamber on the outside of the diaphragm and containing mechanism that is operated by movement of the diaphragm, a second passage through which the opening in the probe communicates with the pressure gauge, one of the passages leading to the diaphragm chamber and the other to the second chamber, both of said chambers being sealed so as to acquire pressures equal to the pressures in said passages, and an indicator movable by said mechanism along a scale, and in which the indicator has a stem which extends into the conduit and both passages extend through the stem, one of which passages communicates with the interior of the probe, the other of which leads into a channel in the end face of the stem, and there is a cover on the end face of the stem over the channel and making the channel a continuation of one passage through the stem, the continuation extending in the direction of the fluid flow in the conduit and the fluid in the passage from said channel being thereby subjected to aspirator suction by the fluid in the conduit.

2. The indicator described in claim 1 and in which the continuation of the passage formed by the channel in the end face of the stem extends from the end of its communicating passage in two different directions, one being toward the direction of fluid flow and the other away from the direction of fluid flow, and the channel tapers from both ends to a throat of minimum cross section at the end of said communicating passage through the stem for producing a venturi action which reduces the fluid pressure in said communicating passage to increase the pressure differential for operating the indicator.

3. An indicator for operation by the difference between the pressures at two different locations in a conduit through which a fluid is flowing, said indicator including a probe extending into the flow stream in the conduit and having an opening facing the oncoming fluid flow for obtaining a combined dynamic and static pressure head within the probe, a first passage communicating with the conduit in a direction free of components facing the oncoming fluid for measuring a lower pressure of the fluid, an aneroid pressure gauge including a first chamber having a flexible wall distorted by pressure difference within and outside of said chamber, and a second chamber outside of the first chamber and containing mechanism that is operated by distortion of the wall of the first chamber, a second passage through which the opening in the probe communicates with the pressure gauge, one of the passages leading to the first chamber and the other to the second chamber, both of said chambers being sealed so as to acquire pressures equal to the pressures in said passages, an indicator movable by said mechanism, the indicator having a stem which extends into the conduit, and both passages extending through the stem, one of which passages communicates with the interior of the probe and the other of which leads into a channel in the end face of the stem, a cover on the end faces of the stem over the channel and making the channel a continuation of one passage through the stem, and in which said cover is a washer on the end of the stem, and the channel at the end face is a slot in a second washer, which slot is covered by the cover washer that is over the channel to form a continuation of the passage for measuring the lower pressure in the fluid.

4. An indicator for operation by the difference between the pressure at two different locations in a conduit through which a fluid is flowing, said indicator including a probe extending into the flow stream in the conduit and having a passage facing the oncoming fluid flow for obtaining a combined dynamic and static pressure head within the probe, a second passage communicating with the conduit at another location and subject to a lower pressure of the fluid, an aneroid pressure gauge including a first chamber having a flexible wall distorted by the pressure difference within and outside of said chamber, an indicator movable by said mechanism, and in which the indicator has a stem which extends into the conduit, and both passages extending through the stem, one of which passages communicates with the interior of the probe, and the other of which passages opens through an end face of the stem near the probe and at a location along a line from the longitudinal axis of the probe, which line makes an angle of about 25 to 35 degrees with a plane extending through the longitudinal axis of the probe and in a direction from the probe counter to the direction of the fluid flow in the conduit.

5. Apparatus for measuring the velocity head of a fluid flowing in a conduit, said apparatus comprising a probe extending into the conduit and part way across the width of the conduit, the probe having a wall with an opening therein facing in the direction of the oncoming fluid flow in the conduit, and a fence extending from the probe in a direction parallel to the longitudinal axis of the conduit, the flange being located between said opening and the end of the probe that is part way across the width of the conduit, the fence extending beyond the outside surface of the probe and upstream from the opening for preventing flow of fluid axially along the probe toward the end thereof.

6. Apparatus for measuring the velocity head of a fluid flowing in a conduit, said apparatus comprising a probe extending into the conduit and part way across the width of the conduit, the probe having a wall with an opening therein facing in the direction of the oncoming fluid flow in the conduit, a sleeve of larger cross section than the probe, the longitudinal axis of the sleeve extending in the direction of the fluid flow in the conduit and the sleeve being located in a position with the probe extending across the hollow interior of the sleeve and with the opening in the probe at an intermediate position between opposite inside surfaces of the sleeve, the sleeve being open at both sides of the probe whereby flow of fluid to the opening in the probe is confined by the sleeve to prevent distortion of the stream direction and of the velocity head pressure of the fluid at the region of said opening.

References Cited in the file of this patent
UNITED STATES PATENTS

| | | |
|---|---|---|
| 1,087,931 | Dodge | Feb. 24, 1914 |
| 1,116,938 | Sheldon | Nov. 10, 1914 |
| 1,870,058 | Levine | Aug. 2, 1932 |
| 2,101,858 | Kinsley | Dec. 14, 1937 |
| 2,182,280 | Chipley et al. | Dec. 5, 1939 |
| 2,245,534 | Slocum | June 10, 1941 |